(12) United States Patent
Shimura

(10) Patent No.: US 6,791,457 B2
(45) Date of Patent: Sep. 14, 2004

(54) TRANSPONDER, INTERROGATOR AND SYSTEM THEREOF

(75) Inventor: Kazuhiro Shimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 99 days.

(21) Appl. No.: 10/033,985

(22) Filed: Jan. 3, 2002

(65) Prior Publication Data
US 2002/0088517 A1 Jul. 11, 2002

(30) Foreign Application Priority Data
Jan. 11, 2001 (JP) .......................... 2001-003997

(51) Int. Cl.$^7$ .............................................. B60C 23/00
(52) U.S. Cl. ...................... 340/448; 340/442; 340/444; 340/447; 73/146.2; 73/146.8; 116/34 R
(58) Field of Search ................................ 340/442, 444, 340/447, 448; 73/146.2, 146.8; 200/61.22; 116/34 R

(56) References Cited

U.S. PATENT DOCUMENTS

| 4,114,151 | A | * | 9/1978 | Denne et al. ......... 343/6.8 LC |
| 4,911,217 | A |   | 3/1990 | Dunn et al. |
| 4,912,471 | A | * | 3/1990 | Tyburski et al. ............... 342/42 |
| 5,218,861 | A | * | 6/1993 | Brown et al. ............... 340/448 |
| 5,731,754 | A | * | 3/1998 | Lee, Jr. et al. ............... 340/447 |

FOREIGN PATENT DOCUMENTS

JP          7-13505          3/1995

* cited by examiner

Primary Examiner—Jeffery Hofsass
Assistant Examiner—Hung Nguyen
(74) Attorney, Agent, or Firm—Rader, Fishman & Grauer PLLC

(57) ABSTRACT

A data transmission-reception unit which operates by means of energy of a received electromagnetic wave and serves as a main circuit, is provided with a sensor circuit as an additional circuit, and a transponder having a sensor power circuit for supplying electric power only to the sensor circuit is constituted. From a sensor charging circuit of an interrogator, an electromagnetic wave of a lower frequency different from a frequency of electromagnetic wave for data communication is radiated, or loop coil-shaped charging antennas are electromagnetic-coupled to thereby charge a capacitor for the sensor power circuit. Thereby, a secondary battery and the capacitor such as a large scale capacitor can be easily charged from an outside, and further, a power consumption for the capacitor can be restrained.

25 Claims, 12 Drawing Sheets

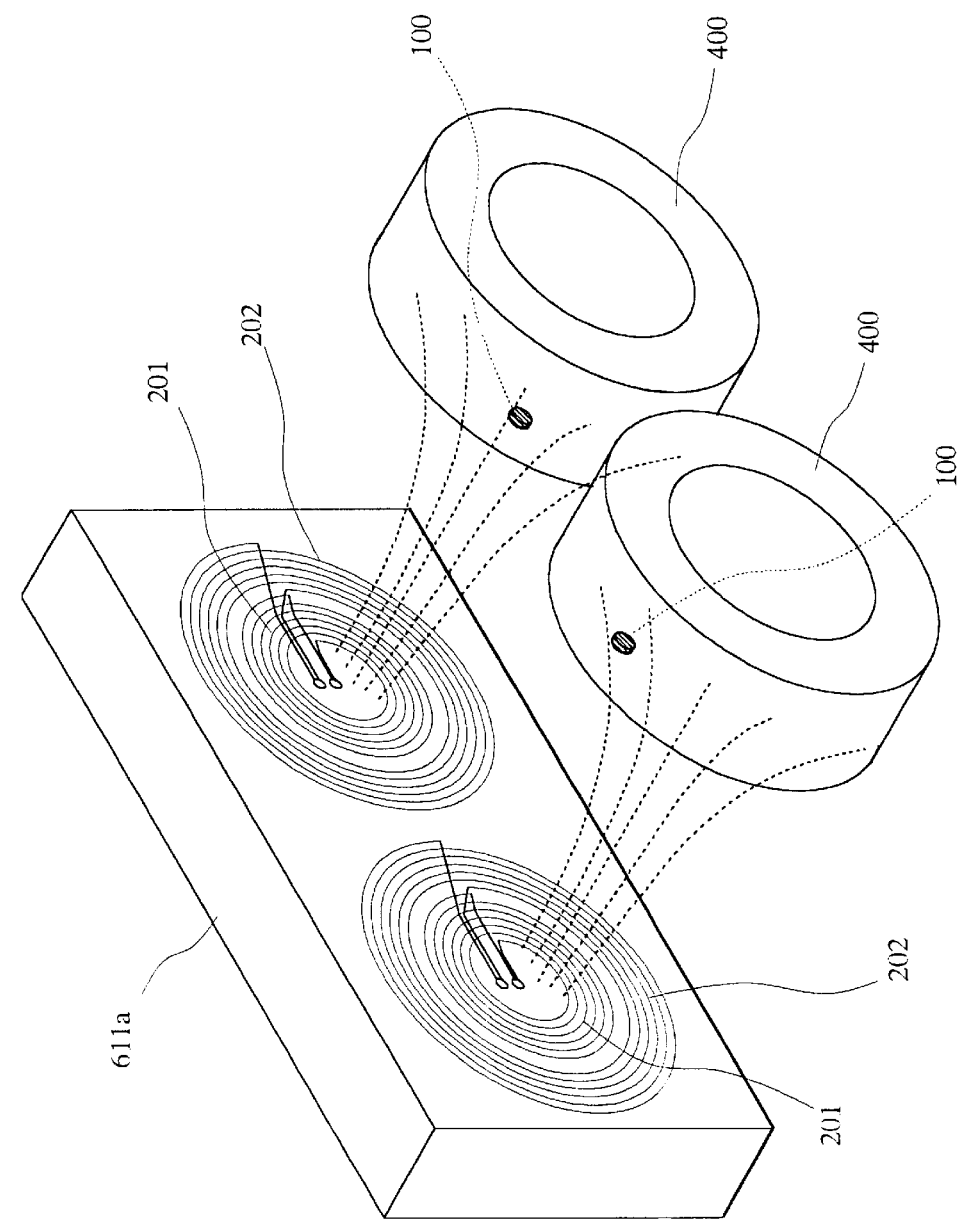

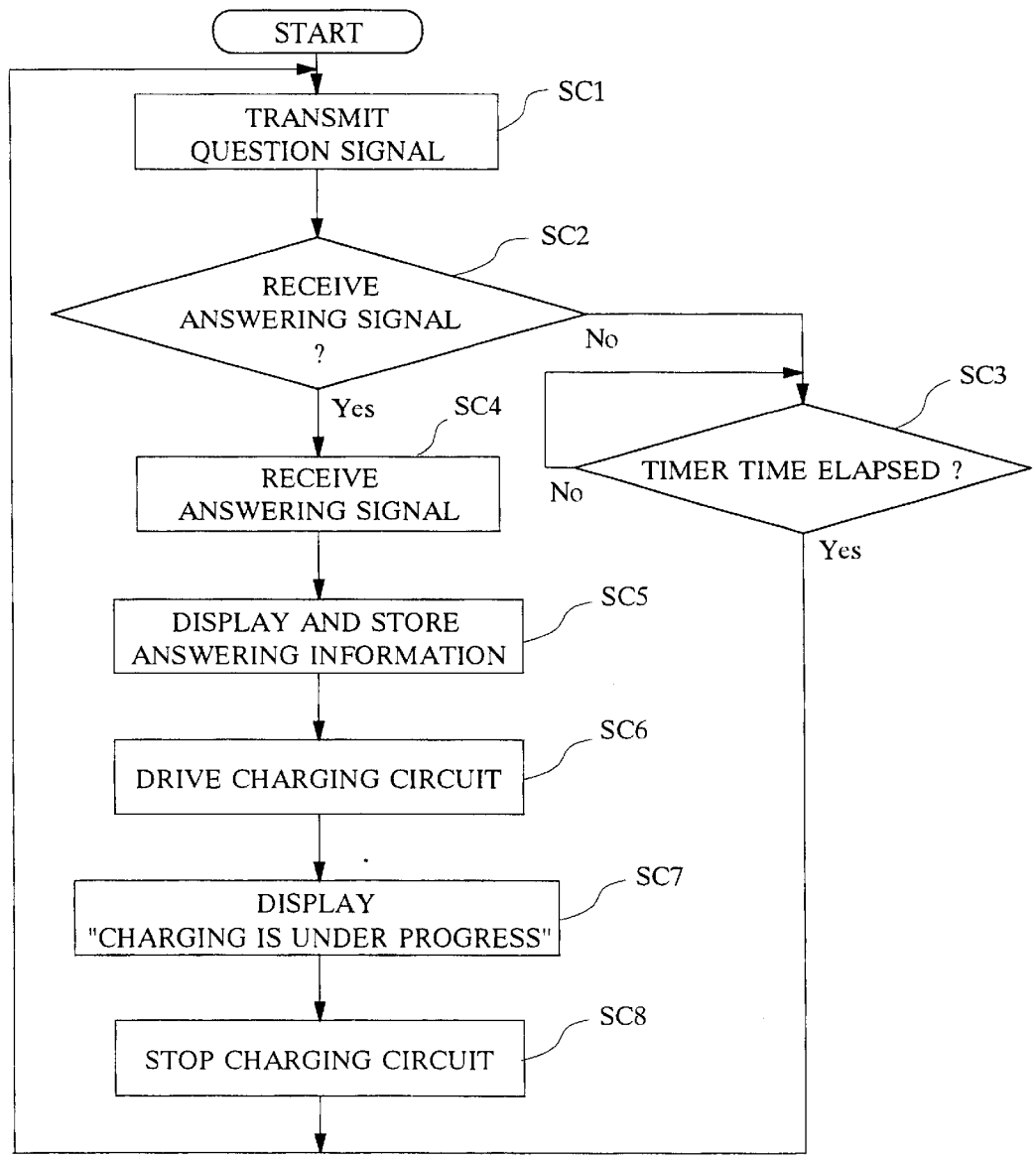

TRANSPONDER, INTERROGATOR AND SYSTEM THEREOF

BACKGROUND OF THE INVENTION

1. Field of the Invention

The present invention relates to a transponder and a system thereof, and more particularly to charging a secondary battery and a capacitor such as a large scale capacitor which is used as a power source.

2. Description of the Related Art

When a tire is distinguished or internal pressure, temperature, a number of revolutions or the like of a tire are going to be obtained, there is known technique of a type in which electric oscillation energy is received from a position spaced apart from a specific tire to transmit a signal from a transponder embedded in the tire.

Also, the transponder is composed of an integrated circuit and an outer shell for protecting the integrated circuit, and has various shapes such as a small coin shape or a cylindrical column shape.

An example of technique of this sort is disclosed in Japanese Utility Model Laid-Open No. 2-123404 specification. According to this technique, an embedded position of the tansponder in a tire is set to the central portion at the tip end level of a carcass ply wound-up portion or on the outer surface of the carcass ply of the pad-less portion.

Also, as another example, there has been disclosed a pneumatic tire with a transponder fitted in Japanese Utility Model Laid-Open No. 7-13505 specification. This has been obtained by improving the above described technique. In this pneumatic tire, there is provided a transponder housing pocket in a protrusion provided on the inner peripheral surface of a bead portion of a troidal-shaped tire. More specifically, the protrusion having the transponder housing pocket is provided on the bead portion having few movement during traveling on the inner peripheral surface of the tire, which is off a portion constituting the tire. For this reason, the tire will not be adversely affected. Further since the transponder is capable of freely entering and going out of the pocket, it is possible to freely inspect the transponder housed or replace in case of necessity.

In a transponder according to the above described conventional example, however, since a battery is used in order to operate an electronic circuit within in most cases, when the battery becomes exhausted, the transponder ceases operation. For this reason, it is necessary to replace the battery periodically, and this replacement operation takes a great deal of time and labor. Also, in the transponder embedded within the tire, the battery could not be replaced.

The present invention has been achieved in views of the above described problems, and is aimed to provide a transponder, an interrogator and a system thereof in which a secondary battery and a capacitor such as a large scale capacitor are capable of being easily charged from the outside. It is another object of the present invention to provide a transponder, an interrogator and a system thereof in which charging can be easily performed from the outside and electric power consumption of the capacitor is restrained.

SUMMARY OF THE INVENTION

A transponder system according to the present invention has a transponder and an interrogator, and has energy supplying means for radiating an electromagnetic wave of a second frequency from an antenna. This antenna is provided in at least one of a station and a parking lot for the vehicle. Further, the energy supplying means radiates an electromagnetic wave to the transponder only when a vehicle equipped with the transponder is at a station or a parking lot for the vehicle. For this reason, when a vehicle equipped with a tire with a transponder is in a station or a parking lot for the vehicle, the transponder system according to the present invention radiates an electromagnetic wave of a second frequency from an antenna by means of the energy supplying means to thereby charge the capacitor for the transponder.

Also, the transponder according to the present invention receives a question signal from the interrogator through the use of the first frequency to convert electromagnetic wave energy of the signal of first frequency received into electric energy by means of first energy converting means. This electric energy operates a central processing unit and transmission means of the transponder. The central processing unit of the transponder reads storage information in the information storage means, and generates an electric signal for representing answering information to the question signal of the first frequency to output to the transmission means. The transmission means transmits the answering signal on the basis of the electric signal from the central processing unit.

Also, the transponder according to the present invention converts electromagnetic wave energy of the second frequency received by the second receiving means into electric energy by means of the second energy converting means. This electric energy charges the capacitor. Electric power accumulated in the capacitor is used as an auxiliary power source or a main power source for operating an additional circuit whose electric power consumption is larger than the main circuit. In this case, since the second frequency has been set to a frequency lower than the first frequency, the capacitor can be charged by receiving the electromagnetic wave of the second frequency even when communication is performed with the interrogator, and the energy can be transmitted at higher efficiency than when the first frequency is used. Also, as the first frequency, a high frequency having fast data transfer speed can be used.

The transponder according to the present invention has, as an additional circuit, a sensor portion for detecting predetermined physical quantity within the tire to output the detection result through an electric signal. Further, the central processing unit has means for taking in the detection result by the sensor portion to include into the answering information. For this reason, the transponder according to the present invention is capable of including physical quantity such as pneumatic pressure and temperature within the tire which has been detected by the sensor portion into the answering information to transmit. Further, the transponder according to the present invention has, in the sensor portion, at least one of a temperature sensor and a pneumatic pressure sensor. For this reason, the transponder according to the present invention is capable of transmitting answering information including information on the temperature and internal pressure of the tire which has been detected by the temperature sensor and the pneumatic pressure sensor.

Also, the transponder according to the present invention uses electric energy charged in the capacitor only to drive the sensor portion. Further, the transponder according to the present invention carries current to the sensor portion from the capacitor only for predetermined time until the physical quantity is detected by the sensor portion and the detection result is taken in the central processing unit. For this reason, the electric energy accumulated in the capacitor is consumed only in a necessary and minimal amount. In the present invention, the capacitor is constituted by a secondary battery or a large scale capacitor. Further, the capacitor has charging capacity capable of charging electrical energy sufficient to obtain detection result by the sensor portion at least once.

The transponder according to the present invention has means for detecting whether or not it is necessary to charge the capacitor, and means for including a signal for requesting charging in an answering signal for transmitting when charging is required on the basis of this detection result. For this reason, for example, when an interrogator or a charging device receives the answering signal including the signal for requesting charging or the signal for requesting charging, the electromagnetic wave of the second frequency is radiated from the interrogator or the charging device to the transponder to automatically perform charging.

The transponder according to the present invention has a loop coil-shaped antenna as an antenna for receiving electromagnetic wave of the second frequency. For this reason, an antenna for transmitting electromagnetic wave of the second frequency is a similar loop coil-shaped antenna, and when these two antennas are approached to each other such that their coil axes substantially coincide with each other, electromagnetic induction by the Lenz's law is performed, and the energy can be transferred more effectively.

On the other hand, the interrogator according to the present invention transmits a question signal to the transponder through the use of an electromagnetic wave of the first frequency by question signal transmission means, and receives an answering signal from the transponder to this question signal by means of receiving means. Further, the interrogator according to the present invention transmits, by means of the energy supplying means, an electromagnetic wave of the second frequency that is different from the first frequency to transfer the energy to the transponder through the electromagnetic wave of this second frequency.

Only when a signal for requesting supply of energy through electromagnetic wave of the second frequency is included in the answering signal, the interrogator according to the present invention has driving control means for driving the energy supplying means. For this reason, only when an answering signal including a signal for requesting charging is received, the energy supplying means is driven to radiate the electromagnetic wave of the second frequency to the transponder.

Also, in the present invention, as an antenna for transmitting the electromagnetic wave of the second frequency to the transponder from the interrogator, a coil-shaped or a volute loop antenna is used. For this reason, an antenna for receiving the electromagnetic wave of the second frequency of the transponder is a similar loop antenna, and when these two antennas are approached to each other such that their coil axes substantially coincide with each other, electromagnetic induction by the Lenz's law is performed, and the energy can be transferred more effectively.

Also, the interrogator according to the present invention has means for detecting existence of the transponder within an area in which energy can be supplied, and driving control means for driving the energy supplying means when there exists the transponder within the area on the basis of this detection result. For this reason, when the existence of the transponder within the area in which the energy can be supplied is detected by means of the interrogator, the energy supplying means is driven and the electromagnetic wave of the second frequency is automatically transmitted from the interrogator to the transponder.

Also, according to the present invention, size and shape of a casing in which each component of the interrogator has been housed are made into portable size and shape, whereby it has been made possible to easily carry it.

Further, according to the present invention, the first frequency is set to a frequency above a short wave region to thereby improve the data transfer efficiency, and the second frequency is set to a frequency below a medium wave region to thereby improve the energy transfer efficiency. Further, according to the present invention, the second frequency is set to a frequency below 200 kHz to thereby further improve the energy transfer efficiency. Also, according to the present invention, so as to prevent communication using the first frequency from being disturbed by higher harmonic of the second frequency, the first frequency has been set to a frequency different from frequencies equal to the integer multiple of the second frequency.

BRIEF DESCRIPTION OF THE DRAWINGS

FIG. 14 is a view for explaining an electromagnetic field state during charging according to the second embodiment of the present invention; and FIG. 15 is a flow chart for explaining an operation of essential portions of a charging device according to the second embodiment of the present invention.

DESCRIPTION OF THE PREFERRED EMBODIMENTS

Hereinafter, with reference to the drawings, the description will be made of an embodiment of the present invention.

Figure 1:
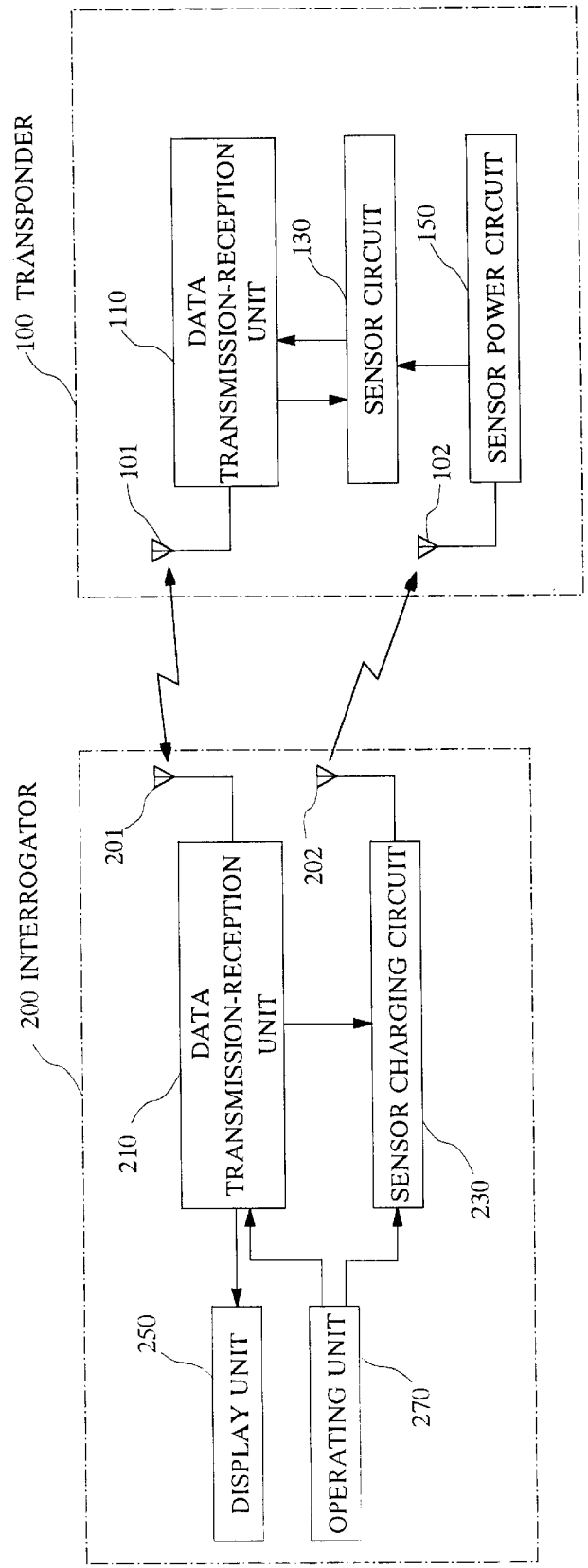
FIG. 1 is a block diagram showing a configuration of a transponder system according to a first embodiment of the present invention.

FIG. 1 is a block diagram showing a configuration of a transponder system according to a first embodiment of the present invention. In FIG. 1, reference numeral 100 denotes a transponder. The transponder 100 is composed of: a data transmission-reception antenna (first reception means) 101; a charging antenna (second reception means) 102; a data transmission-reception unit (main circuit) 110; a sensor circuit (additional circuit) 130; and a sensor power circuit 150. Reference numeral 200 denotes an interrogator. The interrogator 200 is composed of: a data transmission-reception antenna 201; a charging antenna 202; a data transmission-reception unit 210; a sensor charging circuit 230; a display unit 250; and an operating unit 270.

In the transponder system using these transponder 100 and interrogator 200, only when the transponder 100 uses the sensor circuit 130, the sensor power circuit 150 supplies electric power to the sensor circuit 130. Further, when the electric power accumulated in the sensor circuit 130 becomes exhausted, the sensor circuit 130 is charged by the sensor charging circuit 230 of the interrogator 200 by wireless. Hereinafter, the detail will be described.

Figure 2:
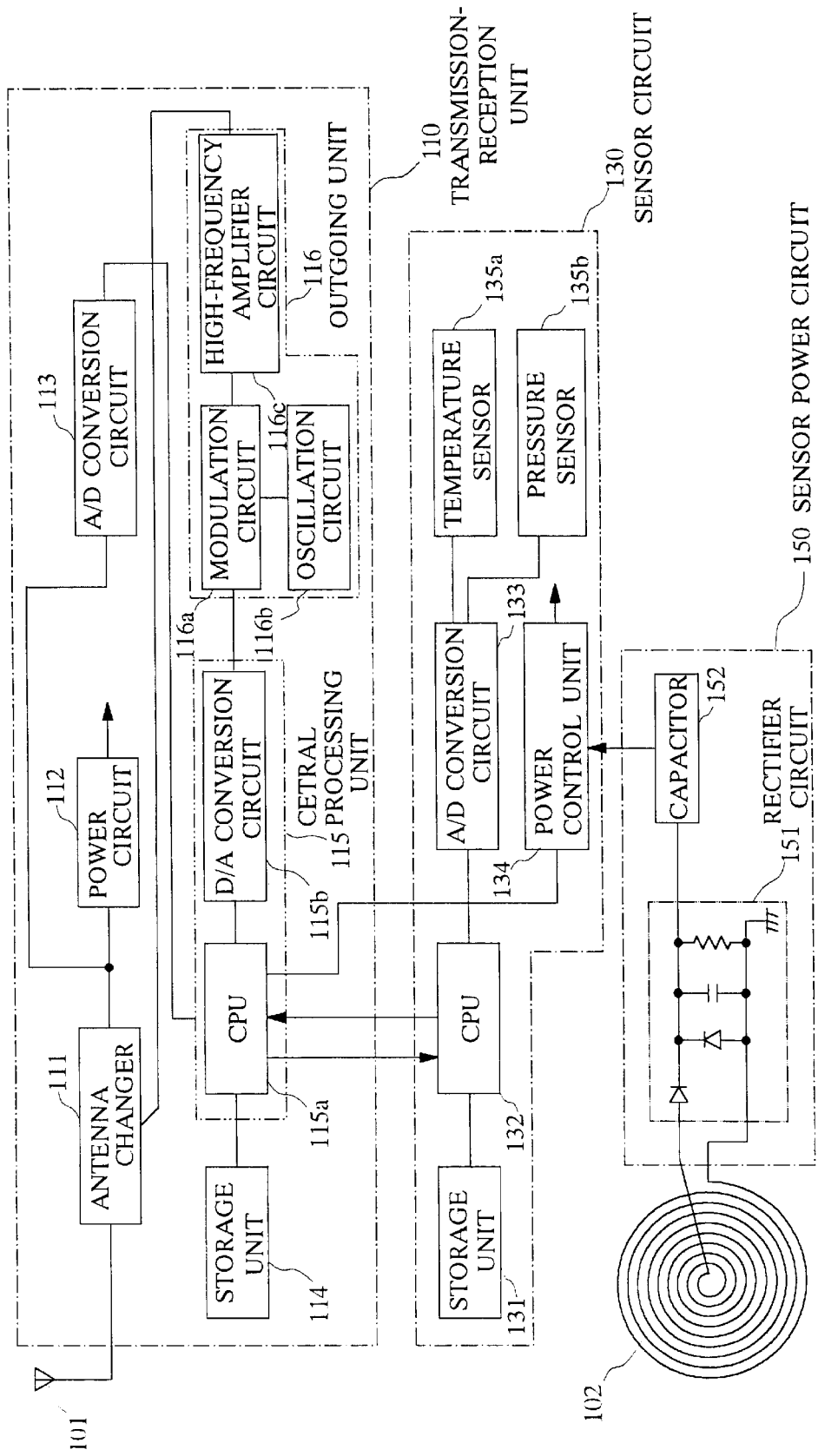
FIG. 2 is a block diagram showing a detailed configuration of the transponder according to the first embodiment of the present invention.

FIG. 2 is a block diagram showing a detailed configuration of the transponder 100. As shown in FIG. 2, a data transmission-reception unit 110 is composed of: an antenna changer 111; a power circuit (first energy conversion means) 112; an analog/digital (hereinafter, referred to as A/D) conversion circuit 113; a storage unit 114; a central processing unit 115; and an outgoing unit 116.

The antenna changer 111 is composed of, for example, an electronic switch. This antenna changer 111 switches the data transmission-reception antenna 101 to either the power circuit 112 and the A/D conversion circuit 113 or the outgoing unit 116 in accordance with a control signal from the CPU 115a for connection. The antenna 101 is usually connected to the power circuit 112 through the antenna changer 111.

The power circuit 112 is composed of a well-known full-wave rectifying circuit. On the input side of this power circuit 112, the antenna 101 is connected through the antenna changer 111. The power circuit 112 rectifies high-frequency current induced to the antenna 101 to convert into direct current, and outputs this direct current as a driving power source for other circuits such as the central processing unit 115, the storage unit 114 and the outgoing unit 116.

The A/D conversion circuit 113 detects a question signal received, and thereafter, converts into digital data to output to the CPU115a.

The central processing unit 115 is composed of an well-known CPU115a and a digital/analog (hereinafter, referred to as D/A) conversion circuit 115b. When power is provided, the CPU115a is driven and inputs a question signal from the A/D conversion circuit 113, the CPU115a drives the sensor circuit 130 to take in detection result on temperature and pneumatic pressure. Further, the central processing unit 115 generates answering information including the detection result taken in and identification information peculiar to itself, and transmits this information as an answering signal through the D/A conversion circuit 115b and the outgoing unit 116. Also, when the detection result cannot be taken in because of the failure of the sensor circuit 130 to operate, the CPU115a regards the electric power accumulated in the sensor power circuit 150 as exhausted, and transmits an answering signal including a request for charging.

The identification information has been stored within the storage unit 114 composed of an electrically rewritable non-volatile semiconductor memory such as EEPROM (Electrically Erasable Programmable Read-Only Memory). This identification information is identification information peculiar to individual transponders 100, and has been stored in an area designated as read-only within the storage unit 114 in advance when the transponder 100 is manufactured.

The outgoing unit 116 is composed of: a modulation circuit 116a; an oscillation circuit 116b; and a high-frequency amplifier circuit 116c. The outgoing unit 116 modulates a carrier wave obtained by oscillating through the use of the oscillation circuit 116b on the basis of the information signal inputted from the central processing unit 115 by the modulation circuit 116a, and supplies this to the antenna 101 through the high-frequency amplifier circuit 116c and the antenna changer 111. In the present embodiment, as the frequency (first frequency) of a high-frequency signal to be outputted from the outgoing unit 116, a frequency of 13.56 MHz is used so as to obtain, for example, necessary and sufficient data transfer speed. For this reason, the data transmission-reception antenna 101 has been set so as to produce resonance at a frequency of 13.56 MHz. In order to obtain necessary and sufficient data transfer speed, it is preferable to set a frequency of electromagnetic wave for data transmission and reception to a frequency above the short wave region.

The sensor circuit 130 is composed of: a storage unit 131; a CPU132; an A/D conversion circuit 133; a power control unit 134; a temperature sensor 135a; and a pneumatic pressure sensor 135b.

Communication is performed between the CPU132 and the CPU115a of the transmission-reception unit 110. Also, on receipt of a request for temperature and pressure information from the CPU115a, the CPU132 acquires the temperature information and pressure information that the temperature sensor 135a and the pneumatic pressure sensor 135b have obtained by detecting through the A/D conversion circuit 133 to transmit these information to the CPU115a.

A power control unit 134 is composed of, for example, an electronic switch, a booster type power circuit or the like, and the electronic switch is turned ON or OFF on the basis of a control signal that is received from the CPU115a of the data transmitter-receptor 110. Further, the power control unit 134 converts electric power to be outputted from the sensor power circuit 150 into voltage required to operate the circuit, and supplies to the storage unit 131, the CPU132, the A/D conversion circuit 133, the temperature sensor 135a and the pneumatic pressure sensor 135b.

The sensor power circuit 150 is composed of a rectifier circuit (second energy converting means) 151 and a capacitor 152. The input side of the rectifier circuit 151 is connected to a charging antenna 102. Also, the output side of the rectifier circuit 151 is connected to the capacitor 152, and also to the power control unit 134. The capacitor 152 is composed of, for example, a large scale capacitor or a secondary battery, and has a capacity sufficient to drive the sensor circuit 130 five times a day.

For example, in case of driving the temperature sensor 135a and the pneumatic pressure sensor 135b, the power consumption of which is 11 mA and the power supply voltage of which is 3 V, assuming that the temperature and pressure are detected five times (before the commencement of work, morning recess, lunch break, afternoon recess and closing time) during daily operating time, a commercial secondary battery having a rating of 3.3V and capacity of about 0.1 mAh can be sufficiently used if it is charged. More specifically, assuming sensor driving time once to be 1 second, the electric energy necessary for a daily operation amounts to 11 mA×3 V×5 seconds/3600=0.046 mWh. Assuming the transmission efficiency for the sensor power source 150 to the sensor circuit 130 (due to the pump-up, leakage current or the like) to be 30%, 0.046/0.3=0.153 mWh is given. Therefore, the commercial secondary battery having a rating of 3.3V and capacity of about 0.1 mAh can be sufficiently used if it is charged.

In the case where this secondary battery is charged for, for example, six hours of non-operating time, assuming the output voltage of the rectifier circuit 151 to be 3.3V and the charging efficiency of the charging current to be 65%, 0.153/3.3/6/0.65=0.019 mA is given. Accordingly, charging can be performed with the current that will not adversely affect the secondary battery.

Also, the charging antenna 102 has been set so as to produce resonance at a frequency of 125 kHz.

Figure 3:
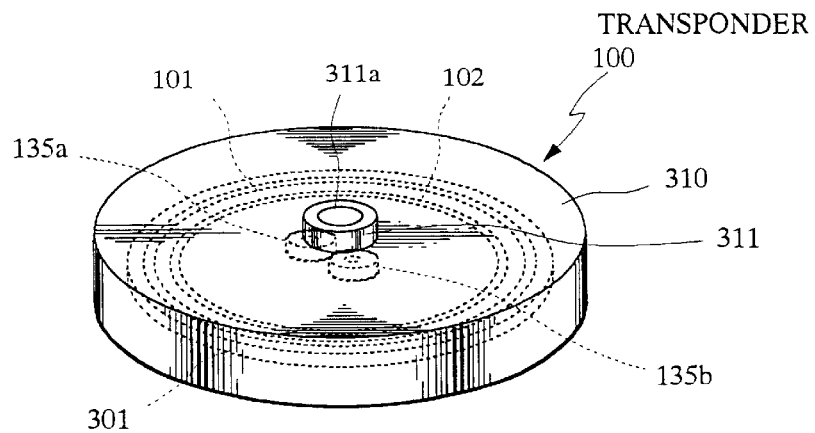
FIG. 3 is an external view showing the transponder according to the first embodiment of the present invention.
Figure 4:
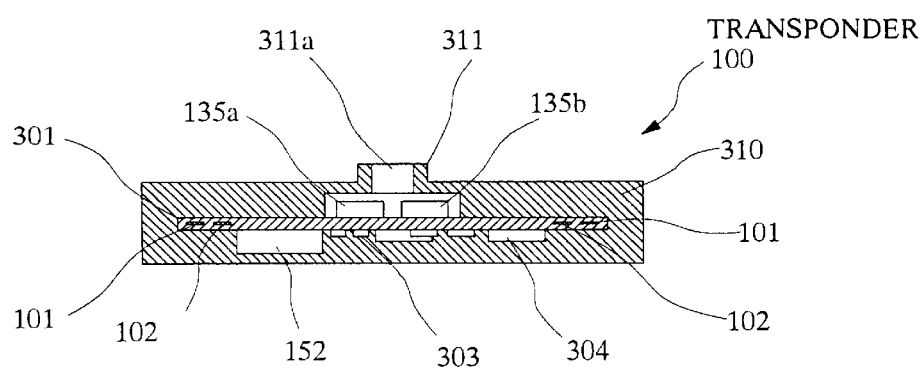
FIG. 4 is a side sectional view showing the transponder according to the first embodiment of the present invention.
Figure 5:
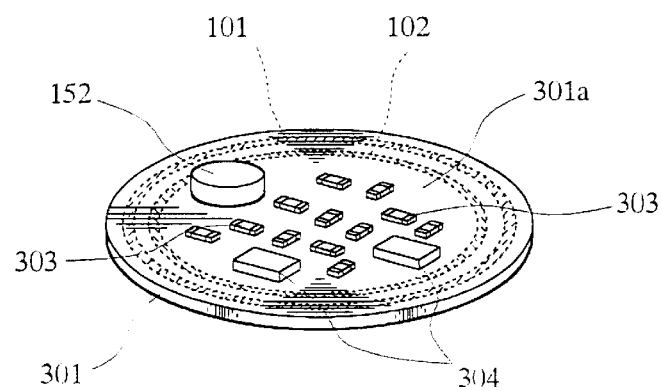
FIG. 5 is a perspective view showing one surface of a circuit substrate of the transponder according to the first embodiment of the present invention.
Figure 6:
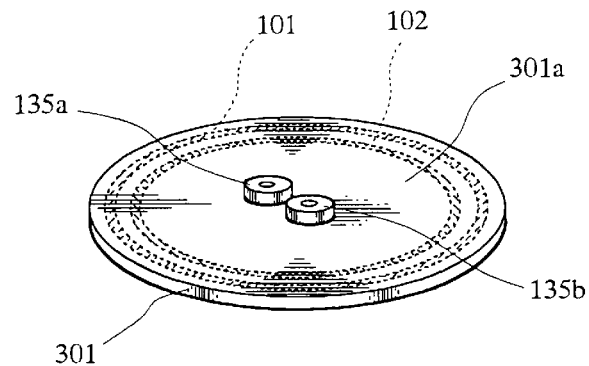
FIG. 6 is a perspective view showing the other surface of the circuit substrate of the transponder according to the first embodiment of the present invention.

FIG. 3 is an external perspective view showing the transponder 100, FIG. 4 is its side sectional view, FIG. 5 is a perspective view showing one surface of its circuit substrate, and FIG. 6 is a perspective view showing the other surface of the circuit substrate.

As shown in these drawings, the transponder 100 has been constituted by molding a disk-shaped multi-layer printed circuit substrate (hereinafter, referred to as circuit substrate simply) 301 which has been packaged with parts, through the use of resin 310. Also, a circular loop-shaped data transmission-reception antenna 101 and a charging antenna 102 have been embedded within the circuit substrate 301. Further, a capacitor 152 and a plurality of chip-shaped electronic parts 303 and IC chips 304 have been packaged on the surface 301a of the circuit substrate 301. Also, a cylindrical column chip-shaped temperature sensor 135a and a pneumatic pressure sensor 135b have been packaged on the back surface of the circuit substrate 301.

Also, the circuit substrate 301 which has been packaged with parts has been sealed with resin 310 with the exception of packaged portions of the temperature sensor 135a and the pneumatic pressure sensor 135b. This resin 310 is formed in a flat plate type cylindrical column shape. Further, the packaged portions of the temperature sensor 135a and the pneumatic pressure sensor 135b have been formed with space so as to allow the open air to be taken in. This space communicates to the outside world through an aperture 311a of a protruded portion 311 provided on the resin 310.

Figure 7:
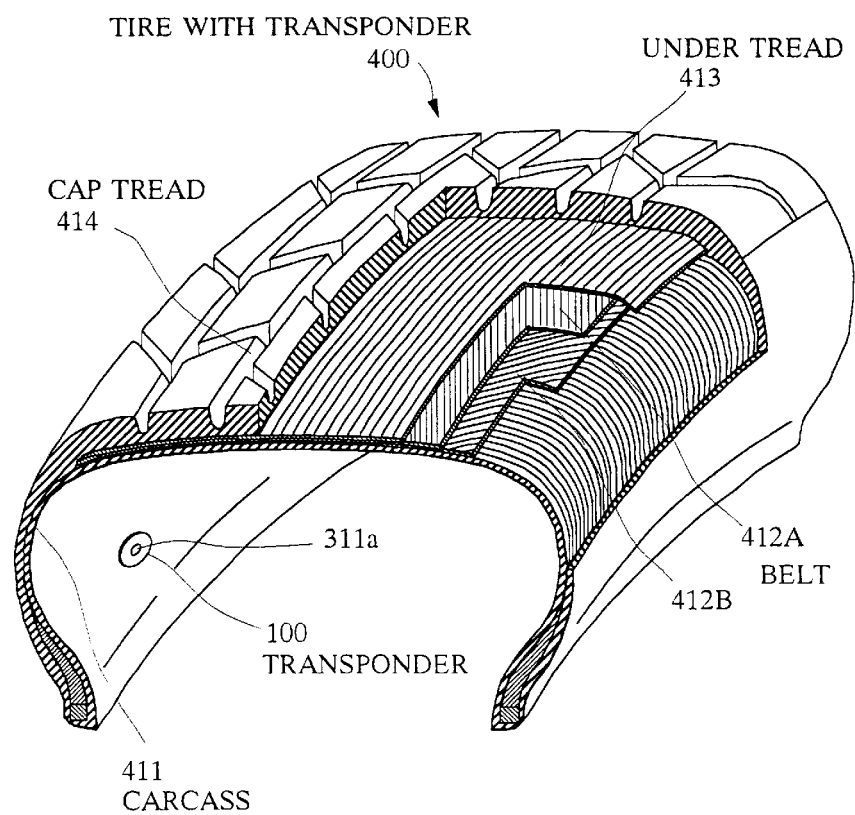
FIG. 7 is an exploded perspective view showing an essential portion of an tire fitted with a transponder according to the first embodiment of the present invention.

The above described transponder 100 is, like the tire with transponder 400 shown in FIG. 7, fitted to the inner side surface of the tire, and is fixed in such a manner that the surface of the circuit substrate 301 becomes substantially perpendicular and that the space within the tire communicates to the space in the packaged portions of the temperature sensor 135a and the pneumatic pressure sensor 135b through the aperture 311a. The tire with transponder 400 used in the present embodiment is a well-known tubeless radial tire, and a reference numeral 411 shown in the figure denotes a carcass; 412A, 412B, a belt; 413, an under tread; and 414, a cap tread.

The transponder 100 is fitted to the tire in such a manner that the surface of the circuit substrate 301 becomes substantially perpendicular as described above, whereby the coil axis of a loop coil-shaped charging antenna 102 becomes substantially horizontal. For this reason, the charging antenna 102 is capable of receiving a charging electromagnetic wave, and when an antenna 202 for radiating the charging electromagnetic wave is similarly loop coil-shaped, and is positioned close to the charging antenna 102, these antennas 102 and 202 can be easily electromagnetic-coupled to each other. This electromagnetic coupling enables energy to be transferred at higher efficiency than when energy is transferred with the electromagnetic wave as a medium.

Figure 8:
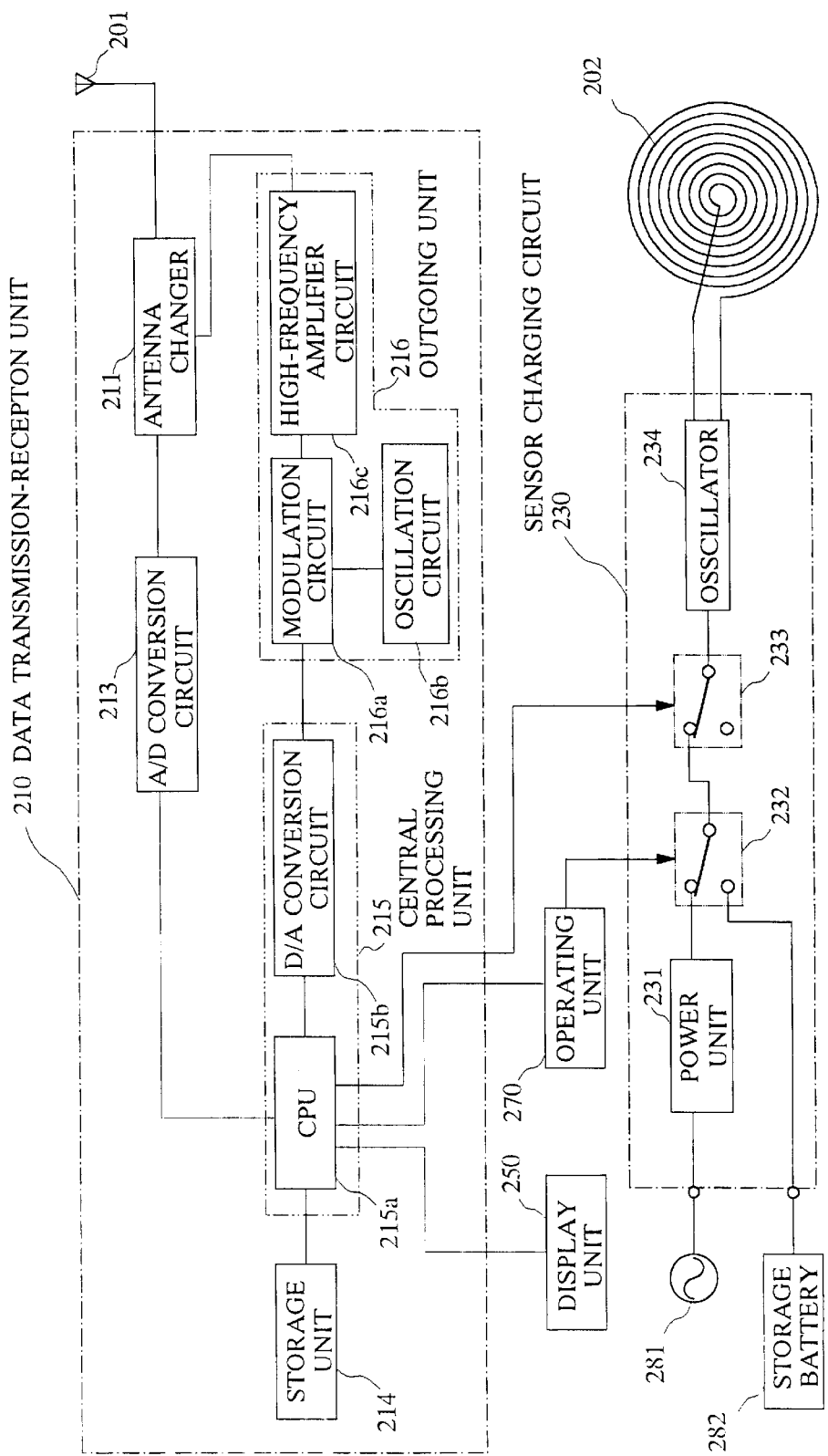
FIG. 8 is a block diagram showing a detailed configuration of an interrogator according to the first embodiment of the present invention.

FIG. 8 is a block diagram showing a detailed configuration of an interrogator 200. As shown in FIG. 8, a data transmission-reception unit 210 is composed of: an antenna changer 211; an A/D conversion circuit 213; a storage unit 214; a central processing unit 215; and an outgoing unit 216.

The antenna changer 211 is composed of, for example, an electronic switch or the like. This antenna changer 211 switches the data transmission-reception antenna 201 to either the A/D conversion circuit 213 or the outgoing unit 216 in accordance with a control signal from the CPU 215a for connection. The antenna 201 is usually connected to the A/D conversion circuit 213 through the antenna changer 211.

The A/D conversion circuit 213 detects a question signal received through the antenna 201, and thereafter, converts into digital data to output to the CPU115a.

The storage unit 214 is composed of an electrically rewritable non-volatile semiconductor memory such as, for example, EEPROM (Electrically Erasable Programmable Read-Only Memory).

The central processing unit 215 is composed of the well-known CPU215a and a D/A conversion circuit 215b. The CPU215a operates on the basis of a preset program, and transmits a question signal to the transponder 100 in accordance with an instruction inputted through the operating unit 270, and receives an answering signal. Further, the CPU215a displays the answering information on the display unit 250, and causes the sensor charging circuit 230 to operate for charging the capacitor 152 for the transponder 100.

The outgoing unit 216 is composed of: a modulation circuit 216a; an oscillation circuit 216b; and a high-frequency amplifier circuit 216c. Also, the outgoing unit 216 modulates a carrier wave obtained by oscillating through the use of the oscillation circuit 216b on the basis of the information signal inputted from the central processing unit 115 by the modulation circuit 216a, and supplies this to the antenna 201 through the high-frequency amplifier circuit 216c and the antenna changer 211. In the present embodiment, as the frequency (first frequency) of a high-frequency signal to be outputted from the outgoing unit 216, a frequency of, for example, 13.56 MHz is used. For this reason, the data transmission-reception antenna 201 has been set so as to produce resonance at a frequency of 13.56 MHz.

A sensor charging circuit 230 is composed of: a power unit 231; electronic switches 232, 233; and an oscillator 234. The input side of the power unit 231 is constructed so as to be able to connect to the commercial power source 281. The power unit 231 converts electric power supplied from the commercial power source 281 into voltage suitable for the input side of the oscillator 234 for output.

The electronic switch 232 is an one-circuit and two-contact switch which is switched through a switching control signal from the operating unit 270, and connects either the power unit 231 or the large scale storage battery 282 to the input side of the oscillator 234.

The electronic switch 233 is switched between ON and OFF through a switching control signal from the CPU215a to switch between supply and non-supply of electric power to the oscillator 234.

The oscillator 234 generates sine wave voltage that alternates at a frequency of, for example, 125 kHz to output to the antenna 202. In this case, as the frequency (second frequency) of sine wave voltage that is generated at the oscillator 234, it is preferable to use any frequency that the higher harmonic and the frequency for use with the data communication as described above do not coincide with. More specifically, when a charging electromagnetic wave is radiated from the charging antenna 202, a charging electromagnetic wave (alternating field) is generated in the vicinity of the transponder 100. For this reason, when the data communication frequency coincides with the higher harmonic, there exists a possibility where the data communication is disturbed. Accordingly, if the relationship between the data communication frequency and the charging frequency is set such that the data communication frequency does not coincide with the higher harmonic of the charging frequency, the data communication will be able to be favorably performed even when the charging electromagnetic wave is being radiated.

Further, if charging is performed through the use of an electromagnetic wave of low frequencies, the energy transmission efficiency will be improved and time required for energy transmission will be able to be shortened. Accordingly, as the frequency of electromagnetic waves to be used for charging, any frequency below medium wave region is preferable, and further when electromagnetic coupling is taken into consideration, frequencies below 200 kHz are preferably used.

Figure 9:
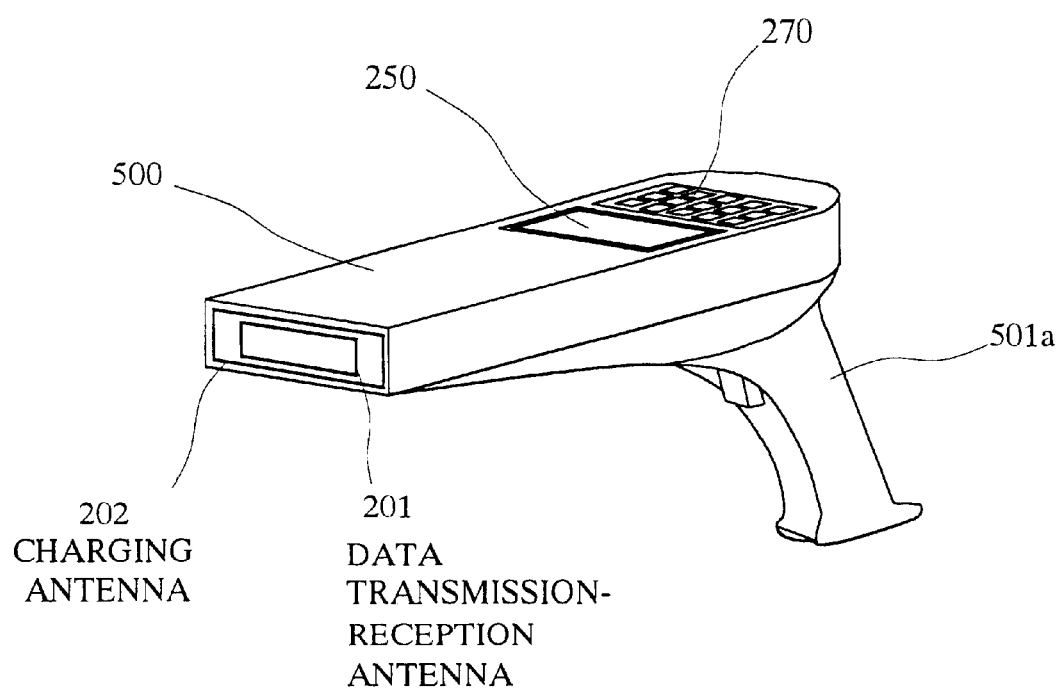
FIG. 9 is an external view showing the interrogator according to the first embodiment of the present invention.

Also, the interrogator 200 is, as shown in, for example, FIG. 9, incorporated within a hand-held type housing 500 having a pistol shape. At the tip end portion of this housing 500, there are arranged a loop coil-shaped data transmission-reception antenna 201 and a charging antenna 202. On the top surface of the housing 500, there are arranged an operating unit 270 composed of a keyboard and a display unit 250, and at the bottom of a grip 501a, there is arranged a connector (not shown) for connecting the commercial power source 281 and an external storage battery 282.

Figure 10:
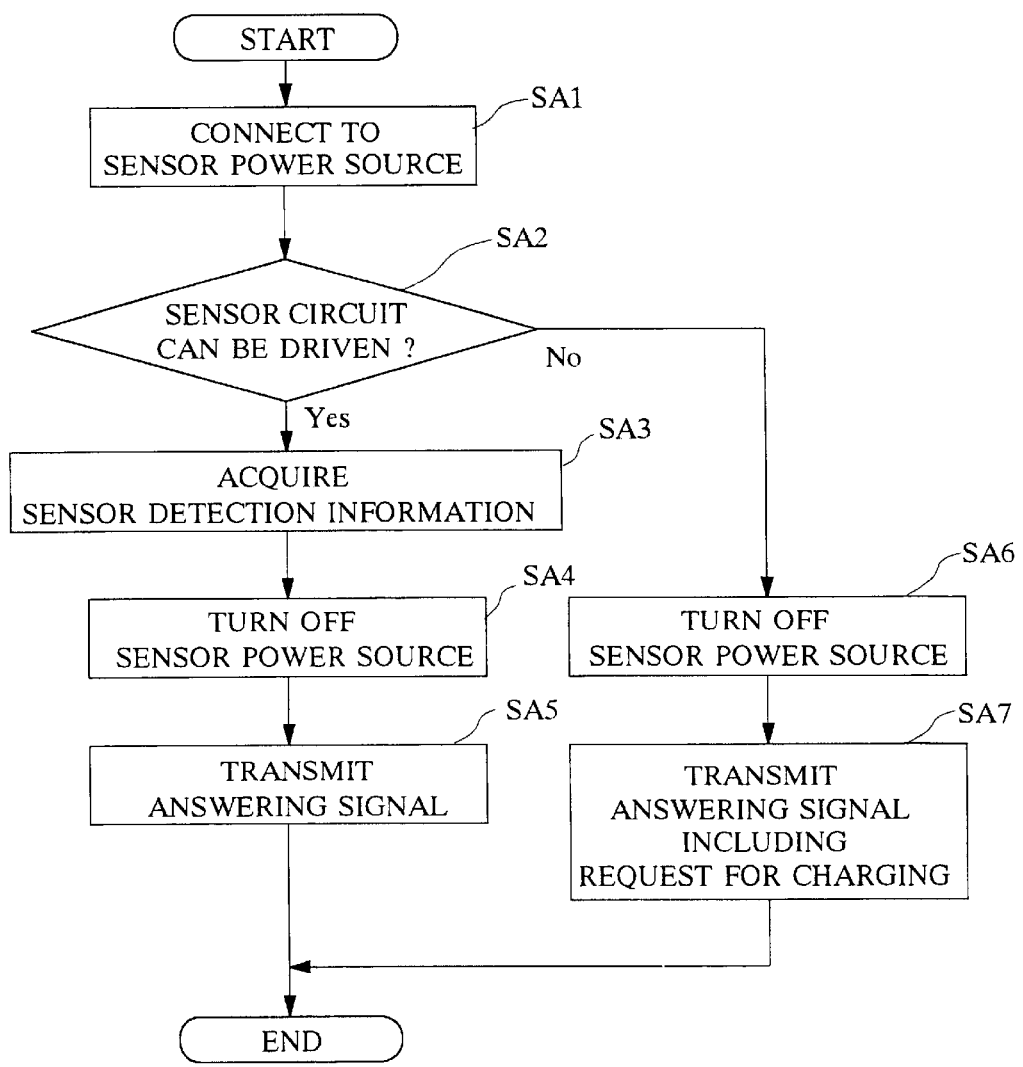
FIG. 10 is a flow chart explaining an operation of essential portions of the transponder according to the first embodiment of the present invention.
Figure 11:
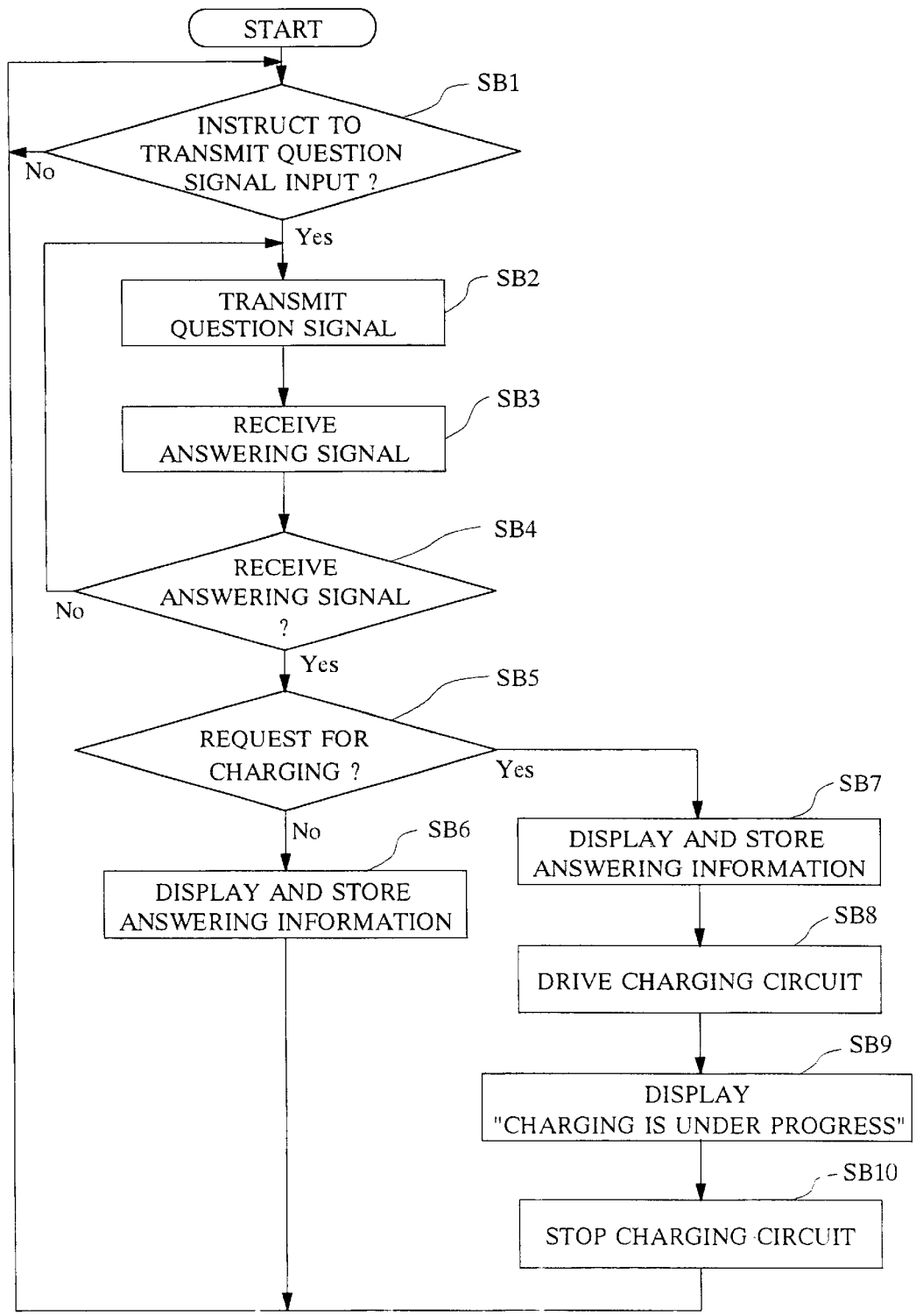
FIG. 11 is a flow chart explaining an operation of essential portions of the interrogator according to the first embodiment of the present invention.

Next, with reference to the flow charts of FIGS. 10 and 11, the description will be made of an operation of the transponder system having the above described configuration.

A driver or an inspection worker of a vehicle equipped with the tire with transponders 400 carries the interrogator 200 with him for working, whereby he is capable of reading data of temperature and pneumatic pressure of the tire from the transponder 100 and charging the capacitor 152 of the transponder 100.

On reading data on the temperature and pneumatic pressure from the transponder 100, the antennas 201 and 202 of the interrogator 200 are directed toward the tire to input a transmission instruction of a question signal from the operating unit 270. Thereby, the question signal is transmitted from the interrogator 200, an answering signal transmitted from the transponder 100 correspondingly thereto can be received, and the answering signal is displayed on the display unit 250. Also, when the capacity of the capacitor 152 of the transponder 100 is insufficient, a request for charging is transmitted from the transponder 100, and since the interrogator 200 drives a sensor charging circuit 230 correspondingly thereto, the capacitor 152 of the transponder 100 can be charged.

That is, when the CPU115a of the transponder 100 starts driving by means of the energy of question signal electromagnetic wave received, electric power is supplied from the capacitor 152 to the sensor circuit 130 through the power control unit 134 (SA1). Thereafter, through communication with the CPU132 of the sensor circuit 130, the CPU115a judges whether or not the sensor circuit 130 has been driven (SA2). As the result of this judgment, when there is no answer from the CPU132, or when no normal answer can be obtained, the sequence will proceed to the processing at SA6 to be described later. Also, when a normal answer has been obtained from the CPU132, the CPU115a acquires detection information from the temperature sensor 135a and the pneumatic pressure sensor 135b (SA3). Thereafter, the CPU115a stops the supply of electric power from the capacitor 152 to the sensor circuit 130 through the power control unit 134 (SA4). Next, the CPU115a generates an answering signal including temperature information and pneumatic pressure information acquired, and transmits this answering signal (SA5).

Also, as the result of the judgment at the SA2, when there is no answer from the CPU132, or when no normal answer can be obtained, the CPU115a judges the capacity of the capacitor 152 to be insufficient to sever the connection between the capacitor 152 and the sensor circuit 130 through the power control unit 134 (SA6). Further, the CPU115a generates an answering signal including a request for charging, and transmits this answering signal (SA7).

On the other hand, when it starts driving, the CPU215a of the interrogator 200 supervises whether or not a question signal transmission instruction has been inputted from the operating unit 270 (SB1), and on receipt of the question signal transmission instruction, transmits a question signal (SB2). Then, the CPU215a performs an answering signal receiving process (SB3) to judge whether or not the answering signal could be received (SB4).

When as the result of the judgment at this SB4, it cannot receive the answering signal, the CPU215a proceeds to the processing at the SB2 to transmit the question signal again. Also, when it could receive the answering signal, the CPU215a judges whether or not this answering signal includes the request for charging (SB5).

When as the result of the judgment at this SB5, no request for charging has been included in the answering signal, the CPU215a displays the answering information including the temperature and pneumatic pressure information of the tire received on the display unit 250, and stores in the storage unit 214 (SB6). Also, when a request for charging is included in the answering signal, the CPU215a displays the answering information including the temperature and pneumatic pressure information of the tire received on the display unit 250 (SB7), and drives the sensor charging circuit 250 to radiate a charging electromagnetic wave (SB8). Further, the CPU215a displays a message "Charging is in progress" on the display unit 250 (SB9), and after an electromagnetic wave is radiated for predetermined time, stops driving of the sensor charging circuit 230 (SB10) to proceed to the process at the SB1.

In the transponder 100 having the above described configuration, there is no need for replacing the internal battery unlike the conventional example even if a sensor circuit 130 having great electric power consumption is provided as an additional circuit. The transponder 100 can be semi-permanently used by charging the capacitor 152 for use.

Also, since the capacitor 152 is charged through the use of an electromagnetic wave having a low frequency different from data communication, it is possible to charge the capacitor 152 at high efficiency. Further, at the time of charging the capacitor 152, the antenna 102 of the transponder 100 and the antenna 202 of the interrogator 200 can easily be electromagnetic-coupled. When they are electromagnetic-coupled as described above, the capacitor 152 can be charged at further higher efficiency.

Also, since the transponder 100 supplies electric power to the sensor circuit 130 from the capacitor 152 only when necessary, the electric power consumption of the capacitor 152 can be restrained as far as possible.

Next, the description will be made of a second embodiment according to the present invention.

A transponder system according to a second embodiment has, in addition to the configuration according to the first embodiment, a charging device capable of easily charging the capacitor 152 for the transponder 100 in a vehicle parking lot or station.

Figure 12:
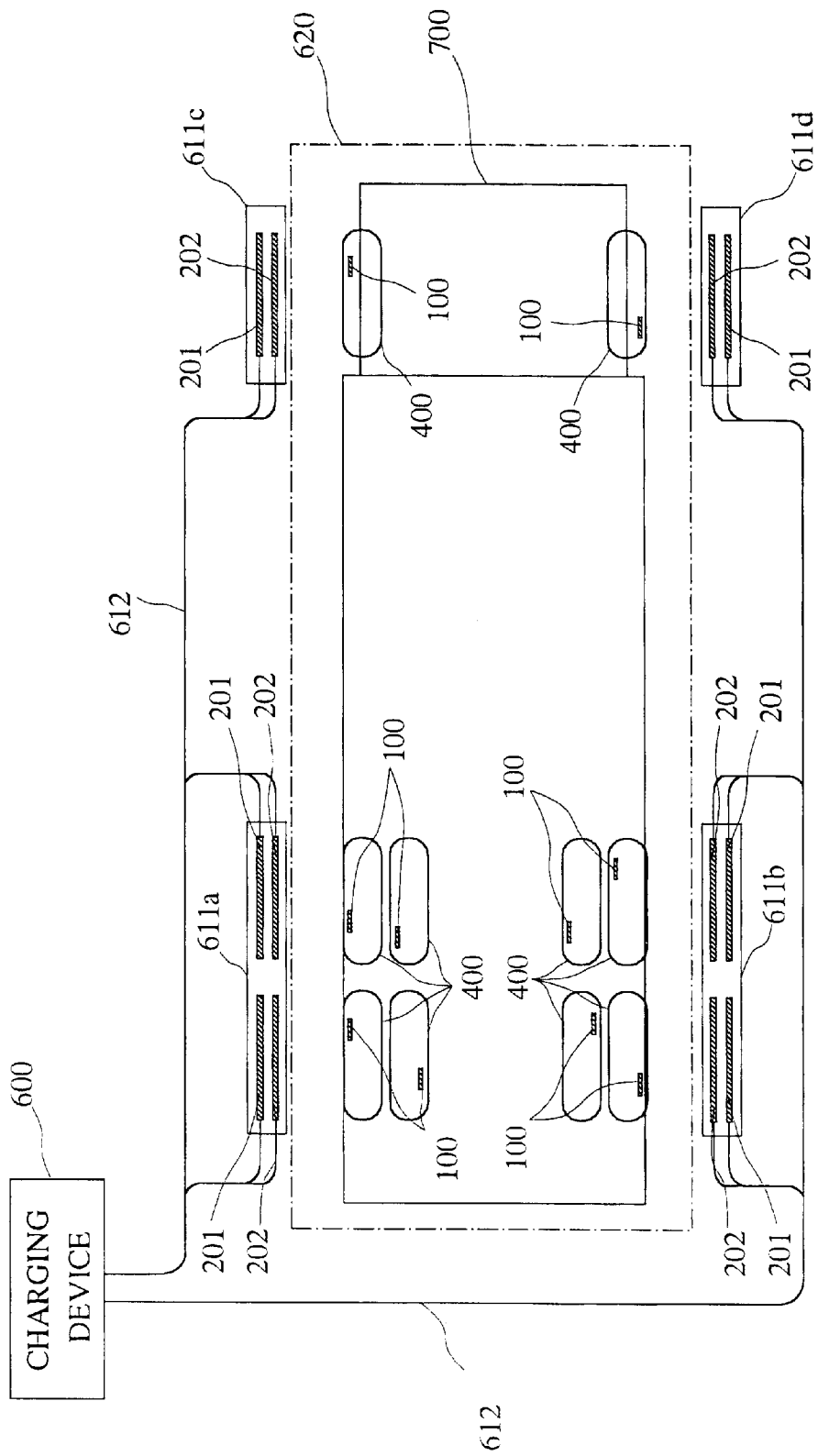
FIG. 12 is a schematic plan view showing a configuration for installing a charging device according to the second embodiment of the present invention in a parking lot or a station.
Figure 13:
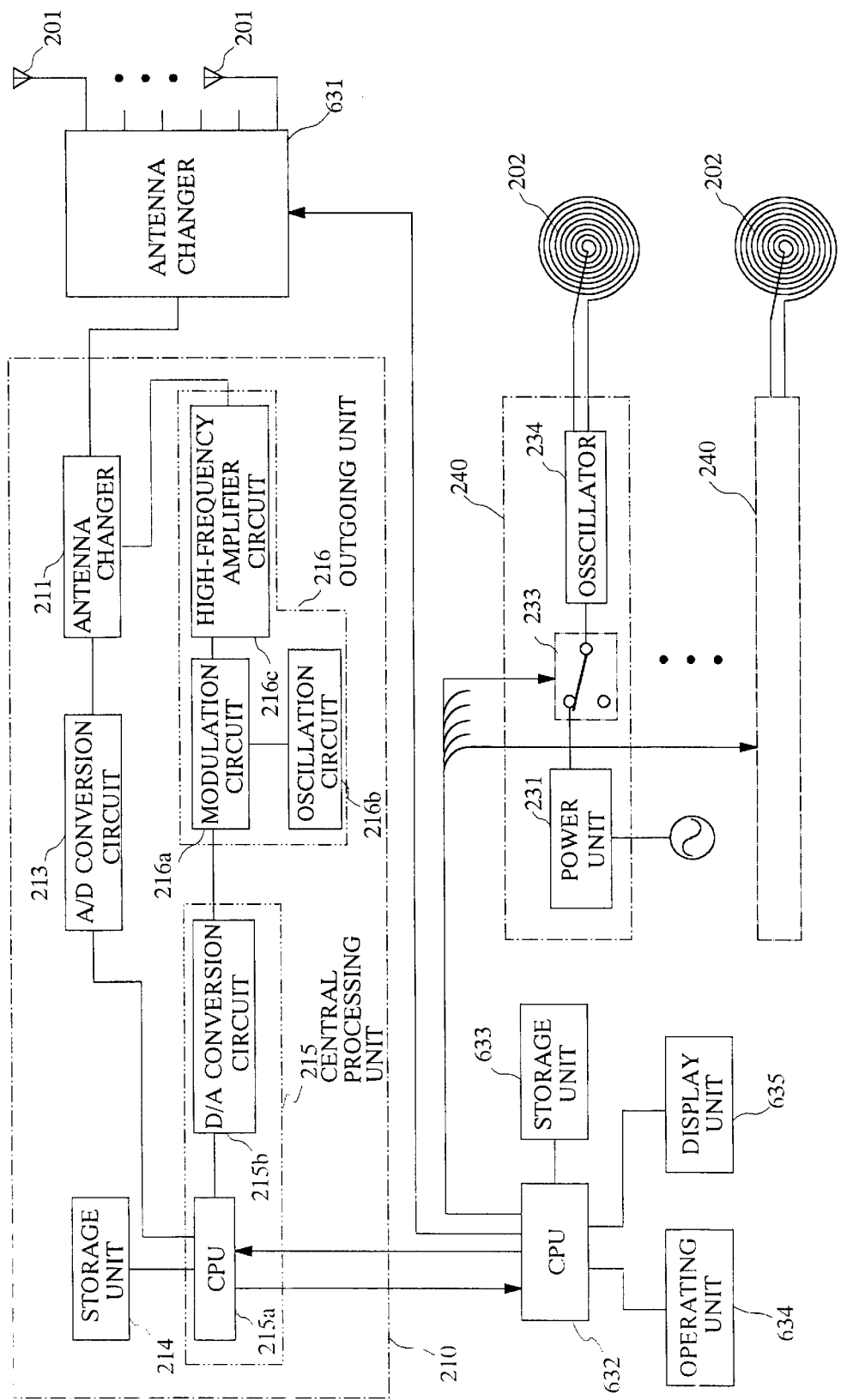
FIG. 13 is a block diagram showing a configuration of a charging device according to the second embodiment of the present invention.

FIG. 12 is a schematic plan view showing the structure for installing a charging device in a parking lot or a station, FIG. 13 is a block diagram showing the configuration of the charging device, and FIG. 14 is a view for explaining an electromagnetic field state during charging. In these drawings, components identical to those in the above described first embodiment are designated by the identical reference numerals, and description thereof will be omitted.

In FIG. 12, reference numeral 600 denotes a charging device; and 620, a parking and stopping area for a vehicle 700 in a parking lot or a station. On both sides of the parking and stopping area 620, antenna installation plates 611a to 611d composed of, for example, a concrete block or the like are provided so as to oppose to tires 400 of the vehicle 700. Each of the antenna installation plates 611a to 611d is, as shown in FIG. 14, provided with a loop coil-shaped data transmission-reception antenna 201 and a charging antenna 202 so as to oppose to the tire 400 of the vehicle 700 which has parked or stopped. These antennas 201 and 202 are arranged such that their coil axes become substantially horizontal and that the coil axis substantially coincides with the tire shaft. Further, each antenna 201, 202 is connected to the charging device 600 through a coaxial cable 612 provided for each antenna.

The charging device 600 is, as shown in FIG. 13, composed of: a data transmission-reception unit 210; a plurality of sensor charging circuits 240; an antenna changer 631; a CPU632; a storage unit 633; an operating unit 634; and a display unit 635, and has a function of the interrogator, a charging function and a transponder detection function.

The antenna connection side of an antenna changer 211 in the data transmission-reception unit 210 is connected to the unit connection side of an antenna changer 631. Thereby, the antenna changer 211 is adapted to be connected to any one of the data transmission-reception antennas 201 provided at each of the antenna installation plates 611a to 611d through the antenna changer 631. This antenna changer 631 is switched on the basis of a switching control signal from the CPU632.

The CPU215a of the data transmission-reception unit 210 communicates with the CPU632, operates in accordance with the instruction from the CPU632, and transfers the information included in an answering signal received to the CPU632.

Each sensor charging circuit 240 is constructed by excluding the electronic switch 232 from the sensor charging circuit 230, and the output side of the power unit 231 is connected to the oscillator 234 through the electronic switch 233. The electronic switch 233 performs an ON-OFF switching operation on the basis of a control signal from the CPU632. Also, the output side of the oscillator 234 in each sensor charging circuit 240 is connected to respectively different charging antennas 202. More specifically, the output side of the oscillator 234 in each sensor charging circuit 240 is connected to any one of the charging antennas 202 provided at each of the antenna installation plates 611a to 611d.

The CPU632 operates on the basis of the preset program. Further, when it has detected that the vehicle 700 is parking or stopping in the parking or stopping area 620, the CPU632 collects temperature and pneumatic pressure information for each tire 400, and drives each sensor charging circuit 240 to charge the capacitor 152 of the transponder 100.

Next, with reference to the flow chart shown in FIG. 15, the description will be made of an operation of the charging device 600 having the above described configuration.

When it starts the operation, the CPU632 of the charging device 600 transmits a question signal through the data transmission-reception unit 210 (SC1), and judges whether or not an answering signal therefor could be received (SC2). At this time, the CPU632 operates the antenna changer 631 to transmit a question signal to each antenna 201, and confirms the answering signal. As the result of this judgment, if an answering signal from the transponder 100 cannot be received, the CPU632 counts predetermined timer time assuming that there is not present any vehicle equipped with a tire with transponder 400 within the parking and stopping area 620, and after the elapse of this timer time, proceeds to the processing at the SC1 to transmit the question signal again (SC3). As described above, the question signal is transmitted from the data transmission-reception unit 210 at predetermined timer time intervals and presence or absence of the answering signal from the transponder 100 is judged, whereby the existence of the transponder 100 within the parking and stopping area 620 can be easily detected.

Also, as a result of the judgment at the SC2, when an answering signal from the transponder 100 could be received, the CPU632 receives the answering signal (SC4), stores information included in the answering signal in the storage unit 633, and displays the information on the display unit 635(SC5).

Next, the CPU632 drives all the sensor charging circuits 240 to radiate a charging electromagnetic wave from the antenna 202 (SC6). Further, the CPU632 displays, on the display unit 635, a message representing that charging is under progress, for example, a message "Charging is under progress" (SC7). Thereafter, after a lapse of the charging time that has been preset in the program, the CPU632 stops the driving of all the sensor charging circuits 240 to complete the charging (SC8), and proceeds to the processing at the SC1.

In this case, when the CPU632 drives the sensor charging circuit 240 to radiate a charging electromagnetic wave from the antenna 202 as shown in FIG. 14, the charging antenna 202 and the charging antenna 102 within the transponder 100 are approached to each other such that their coil axes substantially coincide with each other, and therefore, these loop coil-shaped antennas 202 and 102 are electromagnetic coupled. For this reason, between these antennas 202 and 102, electromagnetic induction by the Lenz's law is performed and energy is transferred efficiently. Therefore, the transfer energy loss to the transponder 100 is reduced, and charging can be performed at high efficiency.

As described above, according to the transponder of the present invention, the electromagnetic wave energy of a frequency of 125 kHz (second frequency) received by the charging antenna 102 (second receiving means) enables the capacitor 152 to be charged, and therefore, by means of the electric power accumulated in this capacitor 152, the sensor circuit 130 (additional circuit), the electric power consumption of which is larger than the transmission-reception unit 110 (main circuit) can be operated. For this reason, such time and effort for battery replacement as in the conventional example can be omitted. Further, since the second frequency has been set to a lower frequency than the first frequency at which data communication is performed, it is possible to receive the electromagnetic wave of the second frequency for charging the capacitor 152 even when communication is being performed with the interrogator, and to transmit energy at higher efficiency than when the first frequency is used.

Also, according to the interrogator of the present embodiment, the capacitor 152 of the transponder 100 can be charged very simply.

Also, according to the transponder system of the present embodiment, the capacitor 152 of the transponder 100 can be charged very simply and automatically.

In this respect, each embodiment described above is one embodiment according to the present invention, and the present invention is not limited only to these. For example, in the charging device 600, the presence or absence of the transponder 100 has been detected through the use of the data transmission-reception unit of the interrogator 200, but if only a vehicle 700 equipped with the transponder 100 parks or stops in the parking and stopping area 620, the charging operation can be performed by detecting the presence or absence of the vehicle 700 in the parking and stopping area 620. Further, only when a request for charging has been received from the transponder 100 of the vehicle 700 which is parking or stopping in the parking and stopping area 620, the charging device 600 can be caused to perform the charging operation.

The present invention can be implemented in other various forms without departing from the spirit or major features of the invention. Therefore, The above described embodiments are only mere illustrations in every respects, and should not be interpreted limitatively. The scope of the present invention is shown by claims, and is not restricted by the text of the specification. Further, alterations and modifications belonging to the range of equivalency of claims are all within the scope of the present invention.

What is claimed is:

1. A transponder for tire having information storage means for gaining access to information within said information storage means at received a predetermined question signal, and for transmitting an answering signal, comprising:
   a main circuit including:
      first receiving means for receiving an electromagnetic wave of a predetermined first frequency;
      first energy converting means for converting energy of the electromagnetic wave received by said first receiving means into electric energy;
      a central processing unit for operating by means of electric energy to be outputted from said first energy converting means and for reading, on receipt of said predetermined question signal by said first receiving means, storage information of said information storage means in response to the content of said predetermined question signal to generate an electric signal representing answering information for outputting; and
      transmission means for operating by means of electric energy to be outputted from said first energy converting means and for transmitting an answering signal on the basis of an electric signal representing said answering information outputted from said central processing unit;
   second receiving means for receiving an electromagnetic wave of a second frequency that is lower than said first frequency;
   second energy converting means for converting energy of an electromagnetic wave received by said second receiving means into electric energy;
   a capacitor for accumulating electric energy to be outputted from said second energy converting means; and
   an additional circuit, in which the electric power consumption of which is larger than that of said main circuit,
   wherein as a main power source or an auxiliary power source for operating said additional circuit, electric energy accumulated in said capacitor is used.

2. The transponder according to claim 1, wherein as said additional circuit, there is provided a sensor portion for detecting predetermined physical quantity within a tire to output the detection result as an electric signal, and said central processing unit has means for taking in detection result by said sensor portion to include into said answering information.

3. The transponder according to claim 2, wherein said electric energy charged in said capacitor is used only to drive said sensor portion.

4. The transponder according to claim 3, wherein there is provided means for carrying current to said sensor portion from said capacitor only for predetermined time until the physical quantity is detected by said sensor portion and said detection result is taken in said central processing unit.

5. The transponder according to claim 2, wherein said capacitor has charging capacity capable of charging electrical energy sufficient to obtain detection result by said sensor portion at least once.

6. The transponder according to claim 2, wherein said sensor portion has at least one of a temperature sensor and a pneumatic pressure sensor.

7. The transponder according to claim 1, wherein said capacitor is constituted by a secondary battery.

8. The transponder according to claim 1, wherein said capacitor is constituted by a large scale capacitor.

9. The transponder according to claim 1, wherein said first frequency is set to a frequency above a short wave region, and said second frequency is set to a frequency below a medium wave region.

10. The transponder according to claim 9, wherein said second frequency is set to a frequency below 200 kHz.

11. The transponder according to claim 1, wherein said first frequency is set to a frequency different from frequencies equal to the integer multiple of said second frequency.

12. The transponder according to claim 1, wherein there are provided means for detecting whether or not it is necessary to charge said capacitor, and means for transmitting said answering signal including a signal for requesting charging when charging is required on the basis of said detection result.

13. The transponder according to claim 1, wherein as an antenna for receiving an electromagnetic wave of said second frequency, said transponder has a loop coil antenna.

14. A transponder system having a transponder fitted to a tire for a vehicle, for transmitting an answering signal on receipt of a question signal, and an interrogator for transmitting said question signal to said transponder and receiving said answering signal from said transponder, wherein as said transponder, a transponder according to any one of claims 1 to 13 is used, there is provided with energy supplying means for radiating an electromagnetic wave of said second frequency from an antenna, said antenna is provided in at least one of a station and a parking lot for said vehicle, and said energy supplying means has means for radiating an electromagnetic wave to said transponder only when a vehicle provided with said transponder is present in the station or parking lot of said vehicle.

15. The transponder system according to claim 14, wherein only when a signal for requesting supply of energy through an electromagnetic wave of said second frequency is included in said answering signal received by said interrogator, there is provided driving control means for driving said energy supplying means.

16. The transponder system according to claim 14, wherein said transponder system is provided with means for detecting existence of said transponder within an area in which energy can be supplied by said energy supplying means, and driving control means for driving said energy supplying means when there exists said transponder within said area on the basis of said detection result.

17. The transponder system according to claim 14, wherein said transponder system has a loop coil antenna as an antenna through which an electromagnetic wave of the second frequency of said energy supplying means is radiated, and said loop coil antenna and a loop coil antenna for receiving an electromagnetic wave of said second frequency in said transponder are electromagnetic-coupled to thereby supply energy.

18. An interrogator for transmitting a question signal to a transponder and receiving an answering signal transmitted from said transponder, comprising:

data transmission-reception unit including:
a transmission-reception antenna;
question signal transmission means for transmitting through the transmission-reception antenna a question signal to said transponder through an electromagnetic wave of a first frequency; and
receiving means for receiving through the transmission-reception antenna an answering signal transmitted from said transponder correspondingly to said question signal; and sensor charging circuit including:
a charging antenna;
energy supplying means for transmitting through the charging antenna an electromagnetic wave of a second frequency different from said first frequency in order to supply electric energy to said transponder; and driving control means for driving said energy supplying means only when a signal for requesting supply of energy through an electromagnetic wave of said second frequency is included in said answering signal.

19. The interrogator according to claim 18, wherein said second frequency is set to a lower frequency than said first frequency.

20. The interrogator according to claim 19, wherein
said first frequency is set to a frequency above a short wave region, and said second frequency is set to a frequency below a medium wave region.

21. The interrogator according to claim 20, wherein
said second frequency is set to a frequency below 200 kHz.

22. The interrogator according to claim 18, wherein
said first frequency is set to a frequency different from frequencies equal to the integer multiple of said second frequency.

23. The interrogator according to claim 18, wherein
a casing in which each of said question signal transmission means, said receiving means and said energy supplying means is housed has portable size and shape.

24. The interrogator according to claim 18, further comprising a loop coil antenna as an antenna for radiating an electromagnetic wave of said second frequency.

25. An interrogator for transmitting a question signal to a transponder and receiving an answering signal transmitted from said transponder, comprising:

data transmission-reception unit including:
a transmission-reception antenna;
question signal transmission means for transmitting through the transmission-reception antenna a question signal to said transponder through an electromagnetic wave of a first frequency; and
receiving means for receiving through the transmission-reception antenna an answering signal transmitted from said transponder correspondingly to said question signal; and sensor charging circuit including:
a charging antenna; and
energy supplying means for transmitting through the charging antenna an electromagnetic wave of a second frequency different from said first frequency in order to supply electric energy to said transponder, wherein
said interrogator is provided with means for detecting existence of said transponder within an area in which energy can be supplied by said energy supplying means, and driving control means for driving said energy supplying means when there exists said transponder within said area on the basis of said detection result.

* * * * *